(12) United States Patent
Kräuchi et al.

(10) Patent No.: US 8,668,376 B2
(45) Date of Patent: Mar. 11, 2014

(54) APPLIANCE FOR CONDITIONING A MILK-BASED LIQUID

(75) Inventors: Frank Kräuchi, Epautheyres (CH); Gerd Helf, Heiden (DE); Dietmar Becker, Radevormwald (DE); Roland Piller, Corminboeuf (CH)

(73) Assignee: Nestec S.A., Vevey (CH)

( * ) Notice: Subject to any disclaimer, the term of this patent is extended or adjusted under 35 U.S.C. 154(b) by 832 days.

(21) Appl. No.: 12/601,186

(22) PCT Filed: May 23, 2008

(86) PCT No.: PCT/EP2008/056349
§ 371 (c)(1),
(2), (4) Date: Nov. 20, 2009

(87) PCT Pub. No.: WO2008/142154
PCT Pub. Date: Nov. 27, 2008

(65) Prior Publication Data
US 2010/0192785 A1    Aug. 5, 2010

(30) Foreign Application Priority Data

| | | |
|---|---|---|
| May 23, 2007 | (DE) | 20 2007 007 337 U |
| May 23, 2007 | (DE) | 20 2007 007 338 U |
| May 23, 2007 | (DE) | 20 2007 007 339 U |
| May 23, 2007 | (DE) | 20 2007 007 340 U |
| Dec. 24, 2007 | (EP) | 07124050 |

(51) Int. Cl.
*A47J 43/046* (2006.01)
*B01F 13/08* (2006.01)

(52) U.S. Cl.
USPC .................. 366/146; 366/274; 219/437

(58) Field of Classification Search
USPC ............... 366/273, 274, 146; 219/446, 437
See application file for complete search history.

(56) References Cited

U.S. PATENT DOCUMENTS

| | | | | |
|---|---|---|---|---|
| 1,293,964 A | * | 2/1919 | Spink | 392/334 |
| 1,984,975 A | * | 12/1934 | Lodder | 366/273 |
| 2,282,866 A | | 5/1942 | Hagen | |
| 2,459,224 A | | 1/1949 | Hendricks | 366/274 |
| 2,518,758 A | | 8/1950 | Cook | 366/274 |
| 2,932,493 A | | 4/1960 | Jacobs | |

(Continued)

FOREIGN PATENT DOCUMENTS

| | | |
|---|---|---|
| CN | 2057839 | 6/1990 |
| CN | 1602783 | 4/2005 |

(Continued)

OTHER PUBLICATIONS

International Search Report, PCT/EP2005/11921 mailed Feb. 14, 2006.

(Continued)

*Primary Examiner* — David Sorkin
(74) *Attorney, Agent, or Firm* — Winston & Strawn LLP

(57) ABSTRACT

An appliance for conditioning a liquid made of or based on milk, in particular for preparing heated liquid or a cold or heated frothed liquid. The appliance includes a tank for receiving the liquid that is to be conditioned; a closed compartment secured to the tank; and an electric device located therein for imparting a conditioning effect to the liquid. The compartment is made water impervious and washable under running water without infiltration thereof into the compartment containing the electric device.

23 Claims, 4 Drawing Sheets

(56) References Cited

U.S. PATENT DOCUMENTS

| | | | |
|---|---|---|---|
| 3,168,294 A | 2/1965 | Tadashi | 366/206 |
| 3,172,645 A | 3/1965 | Price, Jr. | 366/273 |
| 3,351,539 A * | 11/1967 | Branson | 205/148 |
| 3,356,349 A | 12/1967 | Keppler | |
| 3,421,528 A | 1/1969 | Gomez et al. | 134/188 |
| 3,454,745 A * | 7/1969 | Stone | 219/415 |
| 4,162,855 A | 7/1979 | Bender | 366/274 |
| 4,209,259 A | 6/1980 | Rains et al. | 366/273 |
| 4,537,332 A | 8/1985 | Brown et al. | 222/190 |
| 5,048,402 A | 9/1991 | Letournel et al. | 99/348 |
| 6,231,268 B1 * | 5/2001 | Hausenbauer | 405/61 |
| 6,318,247 B1 | 11/2001 | Di Nunzio et al. | 1/99 |
| 6,568,844 B1 | 5/2003 | Arrthun et al. | 366/274 |
| 6,712,497 B2 | 3/2004 | Jersey et al. | 366/274 |
| 7,669,517 B2 | 3/2010 | Boussemart et al. | 99/287 |
| 2001/0036124 A1 | 11/2001 | Rubenstein | 366/205 |
| 2005/0072310 A1 | 4/2005 | Kim | 99/348 |
| 2005/0207272 A1 * | 9/2005 | Morgenthaler et al. | 366/262 |
| 2006/0018187 A1 | 1/2006 | Donna et al. | 366/129 |
| 2006/0209628 A1 * | 9/2006 | Jones et al. | 366/273 |
| 2007/0221068 A1 | 9/2007 | Boussemart et al. | 99/279 |
| 2010/0096343 A1 * | 4/2010 | Hoefken | 210/787 |

FOREIGN PATENT DOCUMENTS

| | | |
|---|---|---|
| DE | 945183 | 7/1956 |
| DE | 1 131 372 | 6/1962 |
| DE | 1 554 670 A1 | 2/1970 |
| DE | 3530764 | 3/1986 |
| DE | 89 15 094 | 3/1990 |
| DE | 69006836 | 6/1994 |
| DE | 29602684 | 6/1996 |
| DE | 196 24 648 | 1/1998 |
| EP | 1 520 498 | 4/2005 |
| FR | 2 795 875 A1 | 1/2001 |
| GB | 243082 | 11/1925 |
| GB | 2 165 260 A | 4/1986 |
| JP | 60151452 | 8/1985 |
| JP | 60194914 | 10/1985 |
| JP | 63177821 | 7/1988 |
| JP | 3091839 | 2/2003 |
| JP | 2004507279 | 3/2004 |
| WO | WO 03/003888 A1 | 1/2003 |
| WO | WO 03/092548 A1 | 11/2003 |
| WO | WO 2004/043213 | 5/2004 |
| WO | WO 2006/050900 | 5/2006 |

OTHER PUBLICATIONS

Notice for Rejection of JP2007-540557, dated Apr. 5, 2011.

International Search Report, PCT/EP2008/056349, mailed Oct. 27, 2008.

Written Opinion of the International Searching Authority mailed Oct. 27, 2008.

* cited by examiner

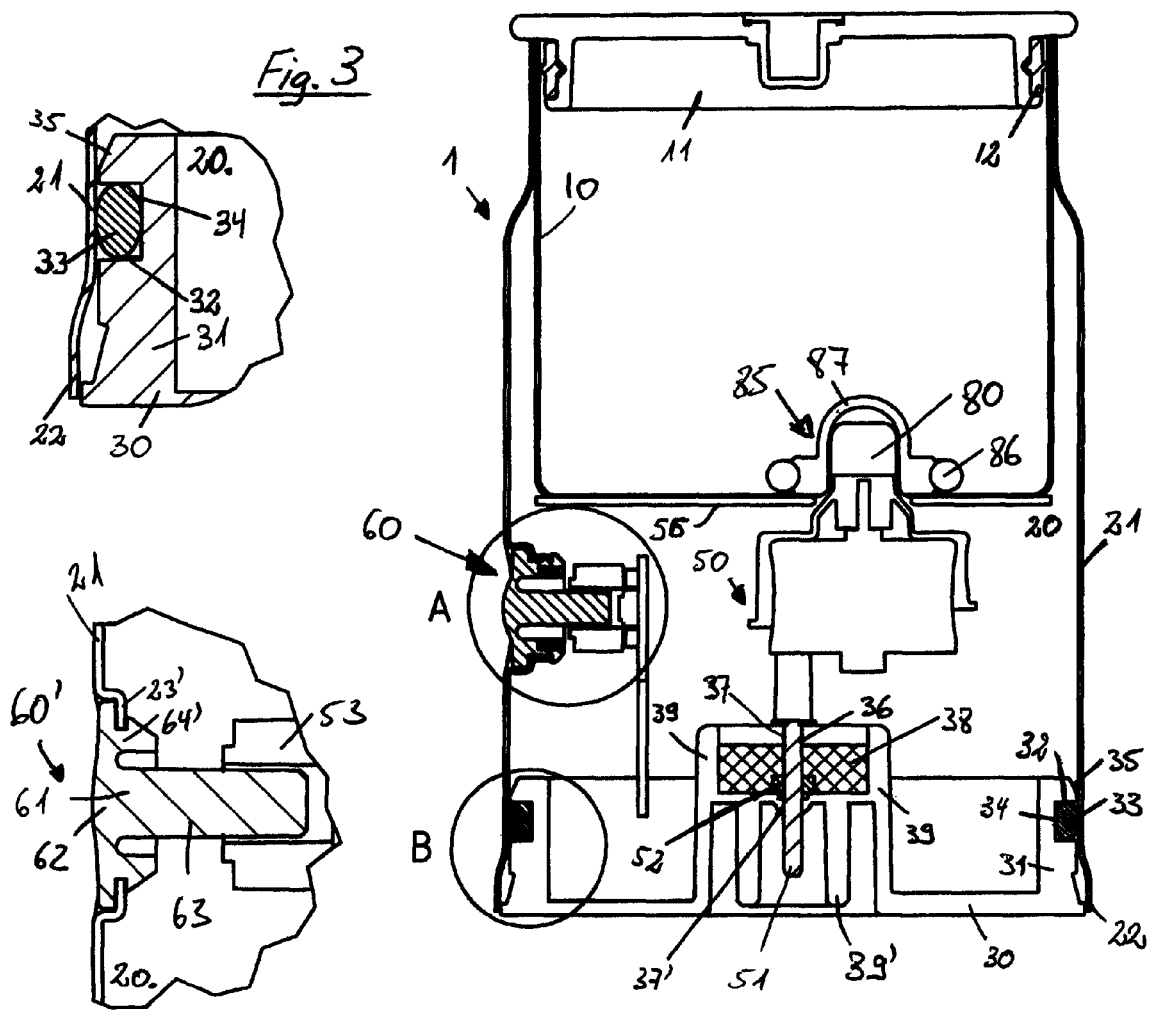

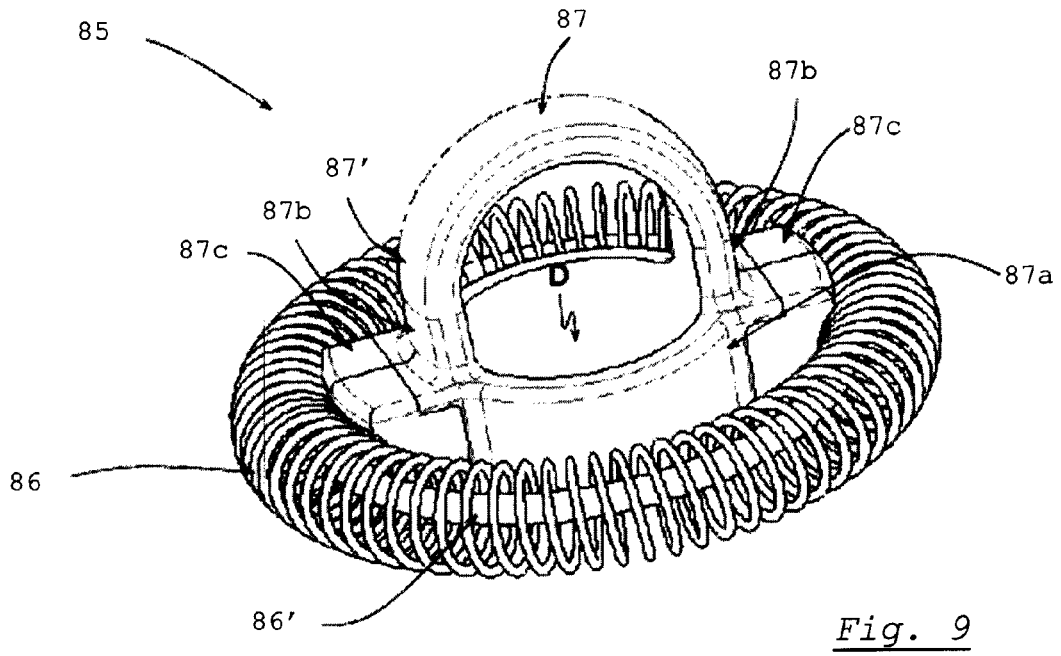
Fig. 9
Fig. 10
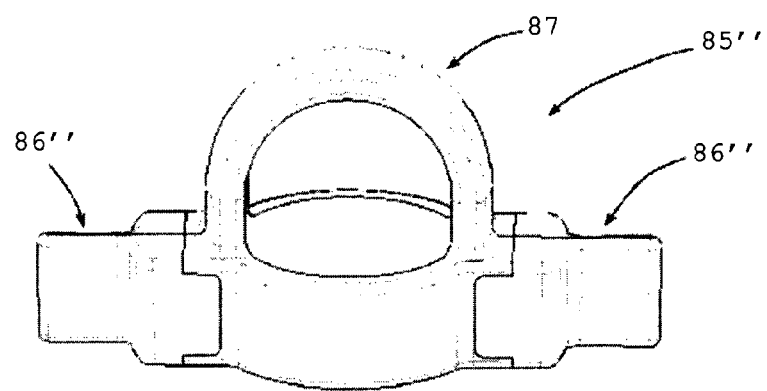
Fig. 11

APPLIANCE FOR CONDITIONING A MILK-BASED LIQUID

This application is the 371 filing of International patent application PCT/EP2008/056349 filed May 23, 2008.

FIELD OF THE INVENTION

The present invention relates to an electric appliance for conditioning a milk-based liquid, in particular for heating and/or frothing such liquid, to be used for example in the context of the preparation of beverages such as cappuccinos, milky coffees, café latte and macchiato, chocolate and other hot or cold beverages.

BACKGROUND ART

Specialty beverages in which at least a portion is made up of frothed or heated milk are becoming more and more popular. The best-known beverage of this type is a coffee of the cappuccino type. It comprises a liquid portion consisting of coffee topped by a layer of frothed milk which, because of its very much lower density, floats atop the surface of the liquid. In general, preparing one takes time, manipulation operations and cleaning.

The most customary way of preparing a milk-based froth is to pour the desired amount of milk into the container, immerse a steam outlet pipe from a coffee machine in the container, agitating it up and down to introduce the air needed to form the froth.

There also exists mechanical stirring appliances which are usually intended for domestic use for beating froth from more or less viscous food products such as eggs, ice, juices or the like. The problem with these appliances is of several natures which means that they are ill-suited to producing froth from a milk-based liquid for making a beverage. One disadvantage, for example, stems from the fact that these appliances stir a liquid or a paste in the cold state, considerably limiting their potential use. In addition, milk does not froth as convincingly when cold or at ambient temperature.

Another disadvantage stems from the fact that these appliances are ill-suited to frothing the microbiologically sensitive liquids such as milk. Regular cleaning of the tank of the appliance needs to be envisaged in order to remove any solid food residue. In addition, heating the milk has a tendency to increase the extent to which cooked or burnt proteins are deposited on and adhere to the surfaces. The existing appliances are not, for the most part, well suited to reducing the encrustation of this solid residue, making cleaning troublesome.

These appliances also have a stirring and drive mechanism which is fixed and intrudes into the tank, and this presents several disadvantages: the removal/refitting time is not insignificant, they have a tendency to become soiled more quickly, they entail additional cost as a result of the multiplicity of components, and the stirring means are difficult to clean.

Another disadvantage with these appliances stems from the fact that frothing in these appliances is not optimal for reasons associated with the arrangement of the stirring means. Some appliances have a stirring means positioned in the middle of the tank. Such an arrangement is not efficient in quickly converting a volume of milk-based liquid into a rich froth.

Other appliances have several stirrers. These arrangements are generally mechanical with gearing means needed to coordinate the rotation of the stirrers, and this makes the system intrusive, and therefore less hygienic, increases the number of parts and makes cleaning a more painstaking operation.

U.S. Pat. No. 6,318,247 relates to an appliance for preparing hot beverages or food with stirring such as hot chocolate, for example. The appliance comprises a system for driving a stirrer of the magnetic effect type. It does, however, have several disadvantages. Firstly, in such an appliance, the liquid or froth is stirred coaxially with respect to the central axis of the tank, and this causes a circulation in which some layers of liquid or froth, particularly the peripheral layers, are not stirred as extensively as others, particularly the layers near the middle, because of the centrifuging effect produced by the stirrer. Such a circulation is therefore not suited to producing a froth of sufficient quality or to reducing the time needed to produce this froth. In addition, the structure of the appliance is not hygienic for treating a milk-based liquid and cleaning is not made any easier by such a construction. Other devices for stirring food products which have more or less the same disadvantages are described in patent documents WO2004/043213 or DE 196 24 648.

Stirring systems with a magnetic engagement type are described in documents U.S. Pat. No. 2,932,493, DE 1 131 372, U.S. Pat. Nos. 4,537,332 and 6,712,497 but none of these provide solutions suited to producing a quality froth in a short time and hygienically.

Utility model DE 89 15 094 relates to a refrigerated pot for dispensing a milk-based beverage. The pot comprises refrigerating means and forced-convection means in the form of a magnetic rotor. Such a device is not suited to converting the liquid into a froth but simply keeps the liquid uniformly at the refrigeration temperature for preservation.

U.S. Pat. No. 3,356,349 discloses a stirring device that has a heated tank, magnetic drive means positioned under the tank for driving a hub located in the middle of the tank. The hub is associated with a stirring element which is offset with respect to the hub, causing the element an oscillatory movement. Such a principle of stirring may create a loss in magnetic coupling because of the high moment of inertia generated by the offset position of the stirring means with respect to the axis of rotation of the drive means. This problem increases with increasing speed. Such a stirring device can therefore work to stir certain liquids or other substances at low speed but may prove ill-suited to converting liquid into a froth at sufficiently high speed. Incidentally, the document does not mention the conversion of a liquid into a froth using this device.

More recently, an improved appliance for preparing froth from a milk-based liquid or milk has been proposed in WO2006/050900. The device has: a tank for receiving the liquid that is to be frothed, in which liquid a rotatable stirrer is positioned; a stand holding the tank; drive and control means which are in a cavity located between the inner tank and the outer stand, and which communicate with a switch and electrical connections located on the outer surface of the stand; and disturbance means to optimise circulation of the milk during frothing. This invention provides a solution to the abovementioned problems. It also recognises the hygiene issues that are raised the handling of milk, in particular heated milk that deposits against inner the walls of the tank. Hence, the device disclosed in the above publication has a tank for containing the milk which has no joining lines or connections between the tank's walls and generally no gaps that would attract the deposition of solids, such as burnt milk.

However, despite the recent hygiene-related improvements regarding the preparation of the froth, it has been found that while the apparatus is handled by users, in particular uncautious handling of the apparatus, for example when frothed milk is removed from the tank, milk may spill and stain the stand and other external parts and raise hygiene problems. The same problems may arise due to presence of the disturbance means that induce and increase agitation in the liquid and thus splashing. This problem is particularly acute in relation with switches, electrical connections and other parts of the stand that may attract milk deposits over time and cause cleaning problems and are in addition hard to clean properly without damaging the electric appliance. One way to solve this problem, at least in part, may involve the use of an appropriate lid and dispensing arrangement configured to avoid spills on the outer part of the appliance. This would however still require special attention by the user to avoid such spills.

SUMMARY OF THE INVENTION

It is therefore an object of the invention to alleviate the disadvantages of the prior art by proposing an appliance better suited for the production of froth from a milk-based food liquid, particularly for producing a beverage, that solves the problem of hygiene resulting from unwanted milk spills and stains that soil external parts of the appliance.

This object is generally achieved by configuring the appliance for conditioning milk or a milk-based liquid so that it can be properly washed with water, and optionally with a detergent and even in a dishwasher. In order to render this electric kitchen appliance properly washable, i.e. not limiting cleaning of the external part by merely wiping its surface with a dry or humid towel like with prior art electric appliances, the sensible parts of the appliance, including the electric and electronic parts, are made water impervious in such a way that even the electric connections and interfaces that extend from the internal electric device through the appliance's housing, may be washed without damaging the appliance.

Hence, the appliance may be safely washed, inside and outside, to remove any milk-based stains and spills so as to avoid any hygiene-related problems including on the external part of the appliance.

Therefore, the invention relates to an appliance for conditioning a liquid made of or based on milk, in particular for preparing heated liquid or a cold or heated frothed liquid. The appliance comprises: a tank for receiving the liquid that is to be conditioned; a closed compartment secured to the tank; and an electric device for imparting a conditioning effect to the liquid, which device is located in the compartment. In accordance with the invention the compartment is made water impervious and washable under running water without infiltration thereof into the compartment containing the electric device.

In other words, all passages leading from outside to inside the compartment, whether they result for example from the assembly of the appliance or whether they are for instance used for connecting the inner part of the compartment to its external part, which passages would allow water infiltration into the compartment, are sealed off.

In any case, the appliance should be washable under running water by hand. Should the appliance also be washable in a dishwasher machine and/or using detergents, the exposed surfaces of the appliance should be made of detergent-resistant materials.

Usually, the electric device has one or more connection means which extend through a through-opening in an outer wall of the compartment. Typically, such through-openings can be made water impervious by a sealing element (or gasket) located between a peripheral part of the connection means and the outer wall. In contrast to prior art deformable covering parts that merely extend over opening in the housing and that can easily be moved away or torn away into such a position as to allow water infiltration through the opening into the inner part of the appliance during normal handling of the appliance, the sealing elements used for the present invention ensures water imperviousness, even when the appliance is thoroughly washed under running water, by hand or even in a dishwasher.

The through-opening may be delimited by a surface of the compartment's wall, the delimitation surface extending from inside to outside the chamber and having a periphery. In such a case, the sealing element may be located inbetween the peripheral part of the connection means and this delimitation surface and extend along the entire periphery of this delimitation surface around the connection means. In other words, the sealing member may advantageously fill any gap in the through-opening between the connection means and the wall through which the connection means extend. To improve the water-imperviousness of this arrangement, the sealing element is preferably deformable and compressed by and between the peripheral part of the connection means and this delimitation surface of the corresponding through-opening. By having a deformed sealing member under permanent compression constraint and tension in the through-opening, i.e. expanding between the connection means and the facing wall, no infiltration passages are left or can be formed during use or handling for water to enter the chamber via the through-opening along the connection means.

Typically, the sealing element is made of or comprises an elastic material, such as a silicon-based material or NBR. The sealing element may also comprise a plastic deformable material. The highest imperviousness is obtained when after deformation, the sealing member is compressed and remains under constraints between and against facing walls of the passage that is to be made impervious, i.e. that is to be sealed off to prevent water penetration. The sealing element can also be made of plastic and/or elastic material, such as silicone, that is cast between a peripheral part of said connection means and the outer wall.

At least one connection means may comprise an electric conductor, in particular a copper and/or aluminium based conductor, for supplying electric power from a power supply to the electric device and/or for communicating a signal from and/or to the electric device.

There are different possibilities to supply electrical power to the appliance (or exchange electric data to and from the appliance's electric device). For example, the appliance can be connected directly via a cable to the mains (or data treatment unit). The cable may be permanently connected with the electric device or it may be linked via a plug and socket connection on the appliance to the electric device. Alternatively, the appliance has a cordless electrical connection assembly that is connectable to an electrical power supply base support to the mains (or data treatment unit). In any case, the imperviousness of the electric connection exiting the appliance's chamber must be ensured to avoid any water infiltration during washing. Further details relating to suitable cordless electrical connections are disclosed in the above-mentioned WO2006/050900.

As mentioned above, the electric conductor may extend through a through-opening which contains a sealing element that is cast and/or deformed in compression between and by the conductor rod or cable and a wall's surface delimiting the through-opening. Optionally, The sealing element is located in a cavity of the through-opening that extends transversally to the conductor rod or cable. The cavity may be partly covered on both sides, i.e. the cavity extending sideways within the wall, or only on one side of the wall. In the latter case, the cavity leads to a narrower aperture on one side of the wall and is entirely uncovered on the other side of the wall.

Typically, at least one connection means comprises or leads to a user interface for controlling the electric device. Such interface may be a switch or a button or any means that is suitable for controlling the electric device contained in the appliance's chamber.

A suitable button may extend into the through-opening. For instance, the button comprises a rigid support element, in particular a rigid annular element, which has a peripheral surface that faces the wall's surface delimiting the through-opening, the sealing element being compressed around the entire peripheral surface between and by said peripheral surface and said wall's surface. In such a case, the sealing element is located and compressed between two facing rigid structures, the wall and the rigid support member. To simplify the manufacture, the button may be directly moulded on the rigid support element. Moreover, the sealing element can be integral with or bonded to the button. In an advantageous configuration, the button, rigid support element and sealing element are formed as a unit that can be force-fitted into the through-opening, i.e. involving the compression of the sealing element, and possibly safely clipped inside the chamber to prevent any later unwanted dislodgement of the water-impervious sealed button.

The button may comprise a movable member that extends through the through-opening, the support element being located around the movable member, the movable member being arranged to communicate into the compartment a user command by displacement of the movable member. The movable member can be movable in translation along the through-opening and/or in rotation, in particular about a rotational axis extending through the trough-opening or parallel thereto. In any case, the button can be a push button and/or a rotational button. For instance, the button may be pushed or rotated to provide different commands to the appliance, e.g. heating by pushing and stirring by rotating the button or vice versa.

Likewise, the electric device in the chamber may also have a timer function, preset or set by the user using an interface linked via a connection means to the appliance's electric device as outlined above. Control signals relating to the operation of the appliance may also be communicated via a connection means to an interface accessible by the user.

Typically, the compartment is formed by the assembly of at least two casing parts, the casing parts being so assembled to be water impervious.

In an embodiment, at least one casing part is formed by at least a part of the tank, at least one further casing part being assembled with the tank to form with the tank, the impervious chamber containing the electric device. For example, the tank for conditioning the liquid is located above the chamber and forms or delimits the upper part of the chamber. The chamber may be formed by a tubular member that holds in its upper inner part the tank and a bottom part that is integral or assembled therewith and that delimits the bottom of the chamber located under the tank. At least one casing part can be a lid or, as mentioned, a bottom element of the chamber.

To ensure water imperviousness, two such casing parts can be assembled together by welding to seal off the chamber. Two of such casing parts may have connection portions that are made of thermoplastic material and that are welded together, in particular by ultrasonic welding. Moreover, two such casing parts can have connection portions that are made of a metal-based material and that are welded together.

When welding is not desired or not possible, for instance because of the specific material combination, the casing parts can be assembled via a sealing element that seals off the chamber. Usually, the sealing element is elastic and/or plastic deformable and compressed by and between cooperating connection portions of the casing parts, as generally discussed above in relation with the through-openings.

Typically, the casing parts have connection portions with substantially facing surfaces that compress the sealing element.

In one embodiment, the sealing element comprises: a body that extends over the surface of one connection portion and that is placed thereagainst; and a plurality of transverse members that protrude from said body to the surface of the facing connection portion and that are compressed between said body and the surface of the facing connection portion. Providing several transverse members that are individually compressed in the passage between the connection portions increases the reliability of the imperviousness of the sealing element. Such a configuration may be used for all deformable sealing elements used for the purpose of the present invention.

A rigid support member may be secured to the connection portion of one of such casing parts to hold the cooperating connection portion of the other casing part, this cooperating connection portion being urged against the rigid support member by the compressed sealing element that is located and compressed between the cooperating connection portions.

Furthermore, a first casing part can be mechanically secured or further secured to or against a second casing part by a mechanical assembly member, such as a screw or rivet, that extends through a through-opening in this first casing part, the through-opening being made water impervious by a sealing element located between a peripheral part of said mechanical assembly member and said first casing part. The particular arrangement of the sealing member can be achieved in a similar manner like for the above discussed connection means.

The appliance may comprise a rotatable stirrer for generating froth in the tank. The electric device in the chamber is then arranged to drive the stirrer in the tank, in particular by generating a rotating magnetic field in the chamber that drives the stirrer in the tank without any mechanical transmission element extending through the tank's walls between the electric device and the stirrer, the stirrer being removably mounted on a stirrer positioning element in the tank, such as a relief or recess in a bottom part of the tank.

Usually the electric device comprises heating means for heating the tank and a drive means for imparting a rotational movement to the stirrer located in the tank.

Further details of suitable drive means and heating means are described in WO2006/050900.

In an advantageous embodiment, the heating means and the drive means are operable independently from one another. In addition to providing the option of heating milk or the milk-based liquid without frothing it, the appliance also permits the frothing of such liquids without heating. It has been discovered that when a sufficient stirring is imparted to milk or a milk-based liquid an acceptable froth may be obtained even from a cold liquid. Therefore, the user is preferably given the possibility to stir the liquid with or without heating thereof.

Another aspect of the invention concerns a rotatable stirrer for an appliance as described above. The stirrer comprises: a positioning bottom part that is arranged to be removably mounted on said positioning element of the tank; and a peripheral part having stirring elements, such as turns of toroidally-shaped wire, impellers, blades, gratings or needles.

Further details relating to suitable configurations of the bottom part and of this peripheral part can be found in WO2006/050900.

In accordance with the invention, the stirrer further comprises a top part extending generally upright from this peripheral part. This top part has a holding portion that is arranged to accommodate for human fingers so as to facilitate extraction and insertion of said stirrer on said positioning element of the tank.

Such a top part enabling enhanced gripping, is particularly useful when the stirrer gets stuck on the bottom, for instance when milk product gets burnt or stick between the stirrer and the positioning element.

For instance, the top part is generally in the shape of an arched member that forms generally an upright loop, optionally the loop forming generally a circle or a fraction of a circle (e.g. half a circle) extending upwards from adjacent opposite sides of the peripheral part. Moreover, the top part forming a loop can further comprise an elongated upright member extending upwards from an upper end of the loop. Such an upright member is optionally topped with a laterally protruding element to facilitate seizure by human fingers, for example a spherical element.

For some yet not fully understood reason, the presence of this generally arched top part improves the quality of the froth produced with such stirrers. This effect is particularly interesting when the appliance is used to produce cold froth, which is significantly more difficult to obtain, if at all obtainable with an acceptable quality, than hot froth using prior art appliances.

A further aspect of the invention relates to an electric device for an appliance as described above. The electric devices comprises: a drive means for imparting a rotational movement to a stirrer associated therewith; and a heating means for heating a tank associated therewith. In accordance with the invention, the heating means and the drive means are operable independently from one another, as discussed above.

The electric device can be associated with a user interface which is arranged to allow independent control of the drive means and of the heating means. The user interface may comprise a first button for controlling the drive means and a second button for controlling the heating means, or a single button with different positions for controlling the drive means and the heating means.

BRIEF DESCRIPTION OF THE DRAWINGS

The invention will now be described with reference to the schematic drawings, wherein:

FIG. 1 shows a section of the appliance according to the invention;

FIG. 3 shows an enlarged view of the assembly according to the invention of the stand and bottom of the appliance shown in FIG. 1.

FIG. 4 shows a prior art button arrangement;

FIG. 9 shows a perspective view of a stirrer of the invention, FIG. 10 showing a cross-section of a part of this stirrer; and FIG. 11 shows another stirrer of the invention.

DETAILED DESCRIPTION

Figure 1A:
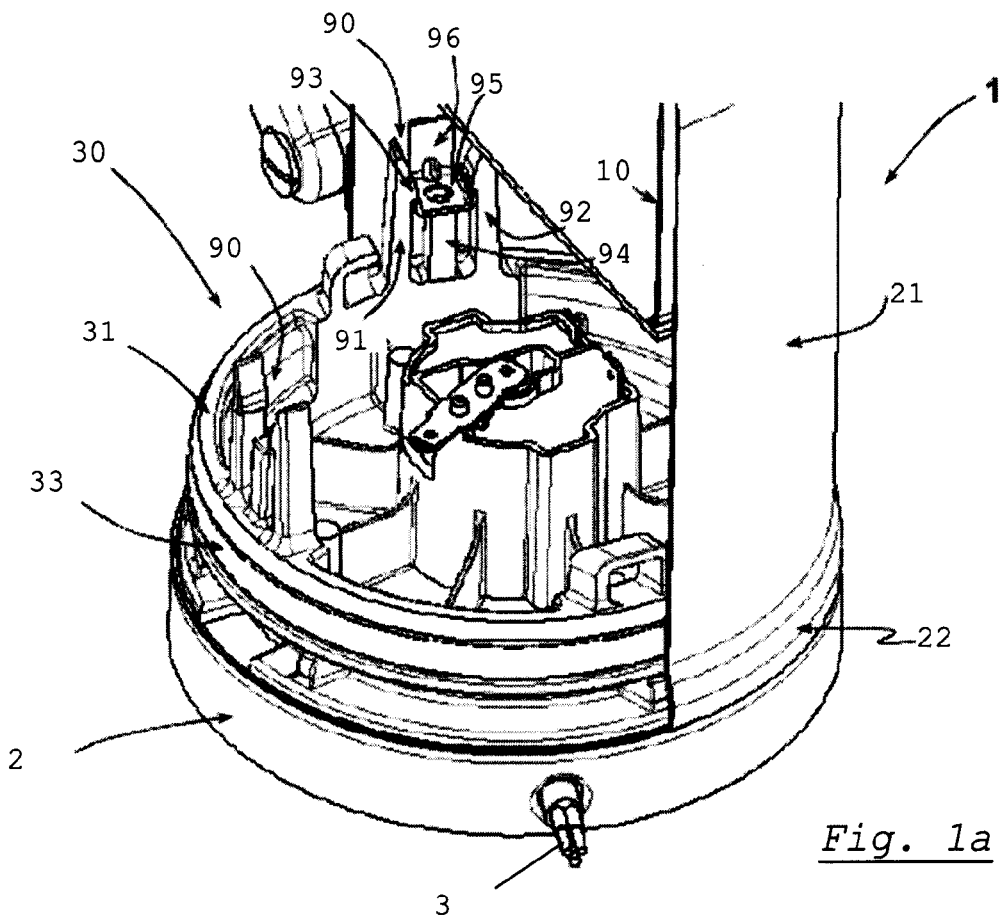
FIG. 1a shows a perspective view of part of the appliance shown in FIG. 1.

An appliance 1 for conditioning a liquid made of or based on milk, in particular for preparing heated liquid and/or a cold or heated frothed liquid, according to the invention is shown in FIGS. 1 and 1a, FIGS. 2 and 3 showing enlarged views of parts A and B, respectively, of FIG. 1.

Appliance 1 has a tank 10 for receiving the liquid that is to be conditioned, a closed compartment 20 located under tank 10; and an electric device 50 for imparting a conditioning effect to a liquid contained in tank 10. Electric device 50 is located in compartment 20. In accordance with the invention compartment 20 is made water impervious and washable with running water without infiltration thereof into the compartment 20 containing the electric device 50.

As shown in FIG. 1, compartment 20 is formed by a generally tubular stand 21 assembled to a rigid plastic bottom 30. The upper part of compartment 20 is delimited by tank 10 which is located inside and secured to stand 21. Thus, tubular stand 21, bottom 30 and tank 10 are three casing parts, which when assembled, form together chamber 20.

Tank 10 and stand 21 are made of metal and welded together at there upper end so that the assembly of the two parts is made water impervious in accordance with the invention. Bottom 30 is made of rigid material, such as rigid plastic material. Tank 10 is covered with a removable lid 11, typically made of plastic, that has a peripheral sealing ring 12.

As depicted in FIG. 3 that shows an enlarged view of portion B of FIG. 1, bottom 30 has an upright peripheral wall 31 facing the inner bottom end of tubular stand 21. Wall 31 has a peripheral groove 32 that faces stand 21 and that extends around the entire bottom 30. A peripheral sealing ring 33 (e.g. an o-ring type gasket) located in groove 32 extends around the entire wall 31. Sealing ring 33 is made of elastic deformable material such as NBR. Ring 33 is squeezed and compressed in groove 32 by the inner bottom end of stand 21 that urges ring 33 into groove 32, especially against the groove's surface 34 facing bottom end of stand 21 and substantially parallel thereto. Thus, compressed sealing ring 33 seals off any gap or passage between stand 21 and bottom 30, so that no water infiltration may occur between stand 21 and bottom 30 during washing, by hand or even in a dishwasher.

Also shown in FIGS. 1 and 3, the bottom end 22 of tubular stand 21 is slightly angled out and the upper end of upright bottom wall 31 has a bevel 35 to facilitate the introduction of bottom 30 into stand 21.

Moreover, as shown in FIG. 1a, to avoid undesirable opening of chamber 21 by the user, bottom 30 may be permanently clipped in stand 21. For this purpose, bottom 30 includes a plurality of clips 90 arranged spaced apart around a peripheral part of bottom 30. Each clip 90 has a pair of generally upright fingers 91,92 with upper hooks 93 and a central rod-shaped abutment member 94 that are arranged for engaging, by clipping, with a corresponding hanger 95 that has a support member 96 mechanically secured, e.g. by welding, against the inner side of stand 21.

From this description, it is apparent that the assembly of the bottom 30 into stand 21 is carried out in a direction that is different, in particular generally perpendicular, to the main compression direction of sealing ring 33 between bottom 30 and stand 21. Hence, the assembly functions and the sealing functions of bottom 30 in stand 21 are dissociated. In other words, sealing is achieved already when ring 33 is entered into stand 21 so as to be effective independently of the precise positioning of bottom 30 in stand 21 and independently of the clipping of clips 90 on hanger 95.

Furthermore, appliance 1 is of the cordless type and intended to be removably placed and powered by an electric base unit 2 that may be connected to the mains via an electric cable 3, as illustrate in FIG. 1a. Therefore, bottom 30 includes a plurality of cordless connector pins 51, one of which is shown in FIG. 1, that are connected to electric device 50 and that are made of an electrically highly conductive material typically metal, such as copper or aluminium or an alloy based thereon. Connector pins 51 extend from inside to outside chamber 20 through a through-opening or passage 36 in bottom 30 for connecting electric device 50 to external base unit 2.

To avoid water infiltration into chamber 20 along a connector pin 51, trough-opening or passage 36 is so arranged as to be water-impervious. Trough-opening or passage 36 includes a top aperture 37 leading into chamber 20, a lower aperture 37' leading outside chamber 20 and an intermediate cavity containing a sealing element 38 between upright walls 39 of bottom 30. The sealing member 38 is made of elastic material, such as silicone that is directly cast around connector pin 51 into the intermediate cavity between upright walls 39 and pin 51 so as to firmly adhere to pin 51 and the surfaces of the cavity, in particular of walls 39, and thus render the intermediate cavity of through-opening or passage 36 water impervious. Moreover, pin 51 comprises an abutment 52 adjacent lower aperture 37' to avoid displacement of pin 51 in through-opening or passage 36. Furthermore, pins 51 are associated with vertical walls 39' that delimit in combination with walls 39 and pins 51 grooves for mounting appliance 1 onto base unit 2 that will support and provide electrical power to the cordless appliance 1. Details of such cordless connectors are for example disclosed in WO2006/050900 and the references cited therein.

Furthermore, appliance 1 comprises a plurality of push-buttons 60, one of which is shown in FIG. 1 and in FIG. 2 that shows an enlarged view of portion A of FIG. 1, for controlling electric device 50 from outside appliance 1.

Push-button 60 extends into chamber 20 through a through-opening in stand 21. Button 60 has a core 61 made of elastic material mounted or injected or cast onto on a rigid ring 67 made of metal, ceramic, hard plastic and/or another hard material.

Core 61 comprises a button head 62 which can be pushed by the user, and a movement transmission rod 63 integral therewith. Button head 62 is integral with a peripheral sealing element 64 and connected therewith via elastic deformable hinge 65 integral with sealing element 64 and button head 62.

As shown in FIG. 2, sealing element 64 is deformed in compression between rigid ring 67 and a (rigid) portion 23 of stand 21. Portion 23 delimits the through-opening that houses push-button 60 and has a surface that faces and is substantially parallel to the surface of rigid ring 67, these two surfaces squeezing sealing element making the through-opening for button 60 water impervious. Moreover, sealing element 64 has a bevelled arrow-like end portion that extends transversally 66 for facilitating the insertion of button 60 into the through-opening and permanently clipping button 60 in stand 21 so as to avoid any displacement or misplacement thereof that would impair the water-imperviousness.

Furthermore, rod 63 of button 60 extends inside chamber 20 between guide members 53 towards a contact element 55 that is connected with electric device 50 and that can be operated by pressing button head 62 and transmission rod 63 thereagainst, thereby deforming hinge 65.

Figure 2A:
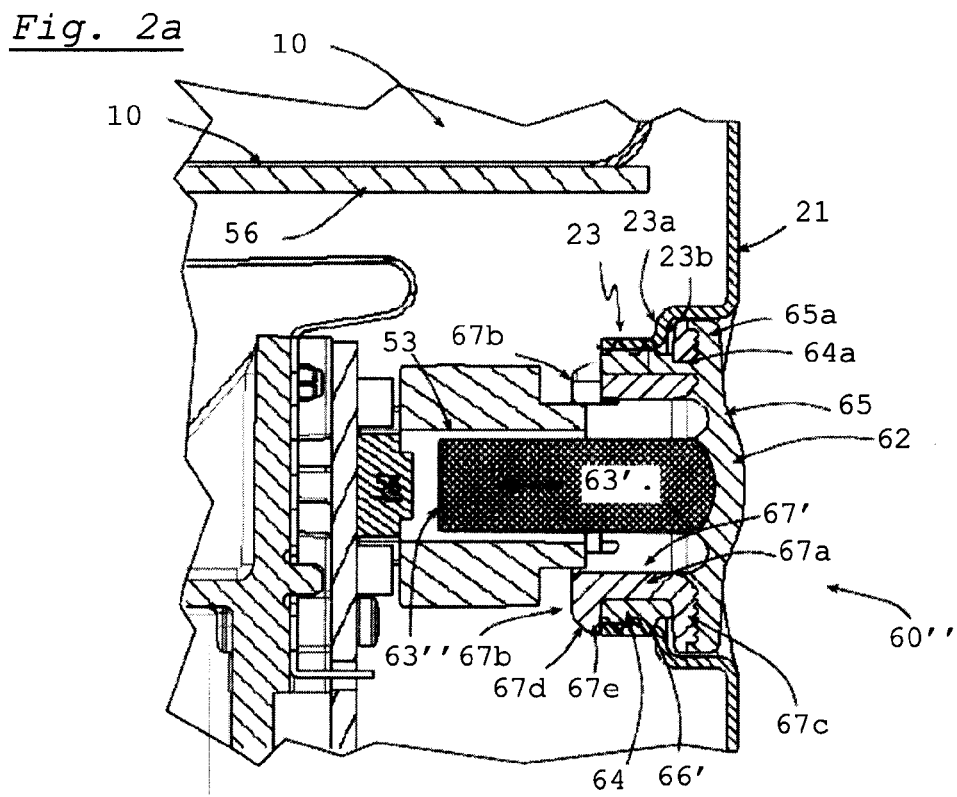
FIG. 2 shows an enlarged view of a button arrangement of the appliance shown in FIG. 1, FIG. 2a showing a variation according to the invention of such a button.

FIG. 2a, in which the same numeric references designate the same elements, shows another button arrangement according to the invention.

Push-button 60" is secured in a through-opening delimited by a rigid wall portion 23 of stand 21 using a rigid annular clipping arrangement 67'. Clipping arrangement 67' has an annular neck 67a which extends along sealing ring 64 and which urges sealing ring 64 against an outside surface 23b of wall 23. Annular neck 67a is formed by a series of spaced apart clipping fingers, one of which is shown in the lower part of FIG. 2a, having an arm 67a with a hook 67b, a bevel 67d, an end 67e extending over the edge of wall portion 23 and a circular flange 67c extending over a ledge 23a of wall portion 23. Flange 67c is covered with a peripheral extension 65a of the button's elastic hinge 65. Sealing ring 64 is connected to button head 62 via connecting portions 64a that extend between the roots of arms 67a which roots join arms 67a to circular flange 67c.

Each clipping finger is slightly resilient and has a bevel 27d to allow insertion of the annular clipping arrangement 67' into the through-opening delimited by wall portion 23 up to ledge 23 and for clipping hook 67b over the edge of wall portion 23.

Furthermore, button head 62 is assembled to a movement transmission hard rod 63' whose end 63" is arranged to push contact element 55 when button-head 62 is pressed by a user.

FIG. 4, in which the same numeric references designate the same elements, shows an arrangement of a comparative prior art button 60'. Similar buttons are disclosed in the abovementioned WO2006/050900.

Button 60' is secured in a through-opening extending through stand 21 by an a peripheral integral part 64' of button 60' that is clipped on edge 23' of stand 21, edge 23' delimiting the through-opening for button 60'. As can be readily seen in FIG. 4, the peripheral integral part 64' is not urged and compressed against edge 23'. This integral part 64' does not firmly obstruct the passage along button 60' into chamber 20, and therefore no water-impervious sealing can be provided, especially when button 60' is pressed, causing a flexion and displacement of peripheral part 64' around edge 23'. This is all the more problematic when the button is exposed to milk spills that may infiltrate chamber 20 and durably soil the electric part of the appliance.

Figure 5:
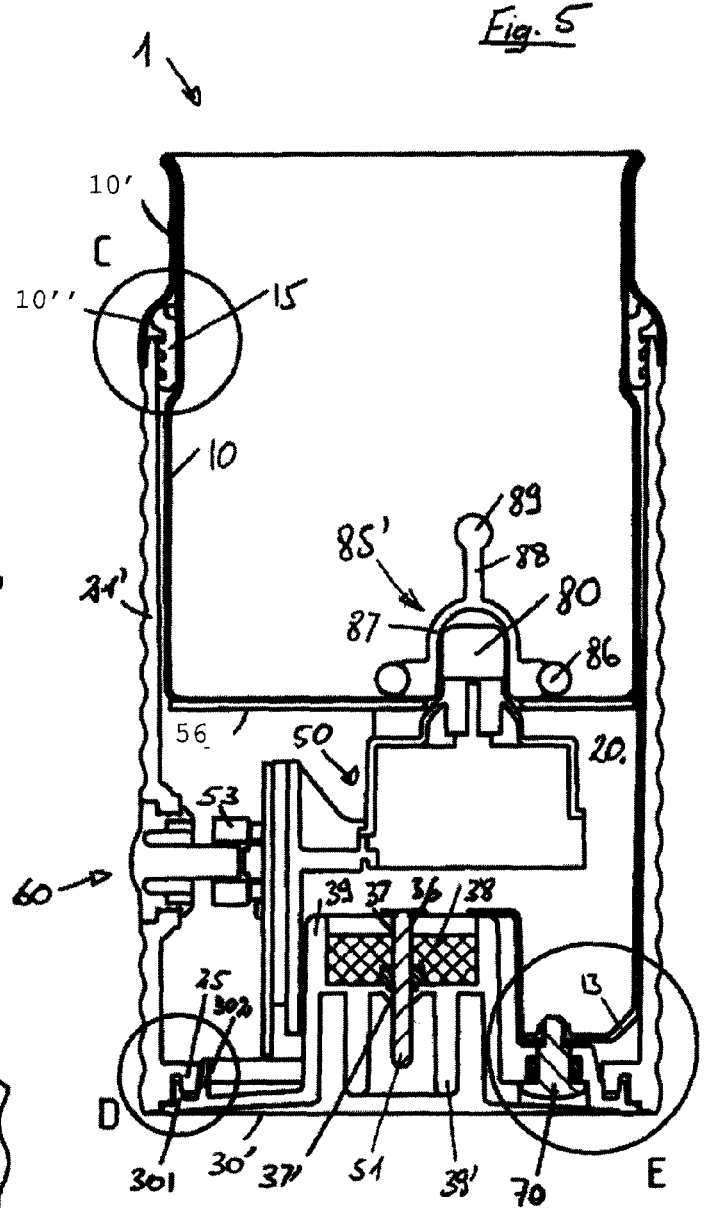
FIG. 5 shows a section of another appliance according to the invention.

FIG. 5 in which the same numeric references designate the same elements, shows another appliance 1 according to the invention. Appliance 1 is shown without lid on tank 10. As opposed to prior art appliances splashes of milk on the external parts of the appliance in not problematic anymore, so that the appliance can be operated without lid, giving the user access to the liquid during the conditioning treatment.

Generally tubular stand 21' is made of a material, typically a plastic material, that cannot be welded to the material of tank 10, typically a metal-based material. Nevertheless, to ensure water-imperviousness of the assembly of stand 21' and tank 10 located therein, a peripheral sealing element 15 is used along the entire junction between tank 10 and stand 21', i.e. around the entire tank 10. Sealing element 15 is made of elastic material such as NBR and is permanently compressed between tank 10 and stand 21'.

Figure 6:
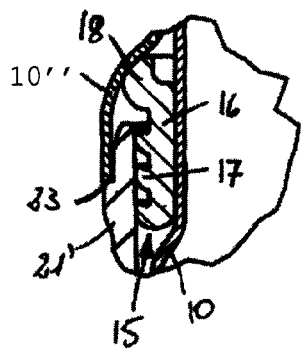
FIGS. 6 to 8 show various enlarged views of parts of the section of FIG. 5.

As shown in greater details in FIG. 6, sealing element 15 has a body 16 that extends over a portion of the surface of tank 10 and that is placed thereagainst; and three peripheral transverse members 17 that protrude from body 16 to the inner surface of the upper end of stand 21'. The peripheral transverse members 17 extend along body 16 around the entire tank 10. The inner surface of stand 21' faces and is generally parallel to said surface of tank 10. These two surfaces compress the transverse members 17 and body 16 of sealing element 15 that is located between these surfaces.

Incidentally, sealing element 64 securing push-button in the through-opening in stand 21 has similar peripheral transverse members that are compressed against portion 23 of stand 21.

Furthermore, the upper end of tank 10 is associated with a down-coming peripheral rigid support member 10' that extends along tank 10 with a lower part 10" that is angled away from tank. The rigid support member 10',10" helps to position and secure tank 10 on stand 21'. Support member 10',10" urges stand 21' against sealing member 15 and tank 10 and, at the same time, stands on a shoulder 23 of stand 21' to secure tank 10 on stand 21'. Sealing element 15 further comprises at its upper end flexible transverse member 18 that seals off the gap between tank 10 and the lower part 10" angling away therefrom.

Appliance 1 has a bottom 30' that is connected to stand 21' by ultrasonic welding. Stand 21' and bottom 30' are, at least where they are welded together, of thermoplastic materials that are compatible for the purpose of welding.

Figure 7:
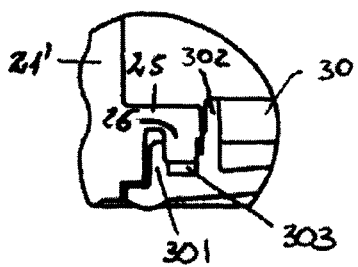

As can be seen in greater detail in FIG. 7 which is an enlarged view of par D of FIG. 5, bottom 30' has two parallel upright peripheral walls 301,302 that delimit thereinbetween a peripheral groove 303. These walls 301,302 and groove 303 extend along the entire periphery of bottom 30'. The bottom part of stand 21' has a generally angled, in particular right-angled connecting member 25 protruding from the inner surface of the bottom part of stand 21', extending along the entire inner surface of stand 21', thereby forming an inner loop over the peripheral part of bottom 30', and having an end portion 26 shaped to accommodate into the groove 303. However, as the width of end portion 26 is prior to assembly larger that the width of groove 303, connecting member 25 and bottom 30' are assembled with the help of an ultrasound welder that causes superficial melting of the surfaces of end portion 26 which, during the welding process, come into contact with correspondingly melting surfaces of peripheral walls 301, 302. Such welding provides a perfectly water-impervious bond between stand 21' and bottom 30'.

Figure 8:
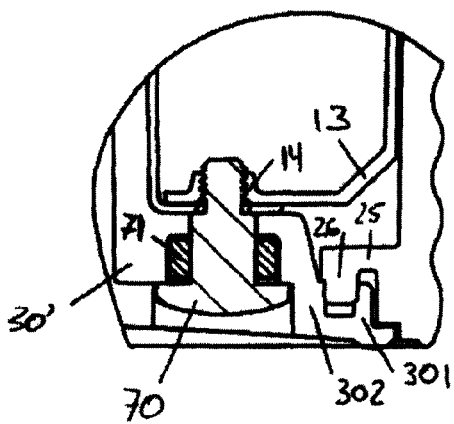

One or more screws 70 can be used to further secure bottom 30' in appliance 1. As shown in FIG. 7 which is an enlarged view of par D of FIG. 5, screw 70 extends through a through-opening in bottom 30'. This through-opening is made water impervious by a sealing ring (e.g. an o-ring type gasket) 71 that is fitted around screw 70 and that is compressed between screw 70 and the facing walls delimiting the through-opening. Furthermore, the bottom part of tank 10 is welded, or otherwise connected, to feet 13, one of which is shown in FIGS. 5 and 8, that extend down along stand 21' to bottom 30' and are provided with a threaded hole 14 for securing screw 70 therein.

Moreover, tanks 10 shown in FIGS. 1 and 5 are provided with a stirrer positioning element 80 for a stirrer 85, 85' which is removably mounted thereon. Stirrer 85,85' includes a peripheral part having stirring elements 86, such as turns of toroidally-shaped wire, impellers, blades, gratings or needles. Suitable drive means and configuration of the rotating stirrer, in particular the magnetic transmission arrangement between the electric device in the chamber and the stirrer in the tank, are disclosed in greater details in the abovementioned WO2006/050900.

However, as opposed to prior art stirrers, stirrers 85,85' have a top part 87,88,89 extending generally upright from peripheral part 86. This top part has a holding portion 87,88, 89 that is arranged to accommodate for human fingers so as to facilitate extraction and insertion of stirrer 85,85' on the positioning element 80 of the tank 10.

The top part 87,88,89 includes a generally semi-circular arched member 87. In contrast to stirrer 85 shown in FIG. 1, stirrer 85' depicted in FIG. 5 further comprises an elongated upright rod 88 extending upwards from an upper end of the arched member 87. Moreover, upright rod 88 is topped with a laterally protruding generally spherical element 89 to facilitate seizure by human fingers.

FIGS. 9 and 10, in which the same numeric references designate the same elements, show stirrer 85 in greater detail. Stirring element 86 is in the form of a spring element in a loop arranged on a ring 86' that is secured via second connecting member 87c to a support member 87a. Arched member 87 is secured to support member 87a via first connecting members 87b. Furthermore, support member 87a has a through-opening D for the passage of stirrer positioning element 80.

Arched member 87, which is shown in cross-section in FIG. 10, and connecting members 87b have a convex outer surface 87' and optionally a concave or straight inner surface 87". Without being bound to any theory, it is believed that that such a cross-section promotes the generation of cavitations during rotation of stirrer 85 in a liquid such as milk, especially nearby connecting members 87b that are subjected to the greatest tangential speed during rotation, leading to the formations of fine bubbles and an improved foaming of the liquid.

FIG. 11, in which the same numeric references designate the same elements, shows another embodiment of a stirrer 85" of the invention. In particular, stirrer 85", instead of having a spring stirring element like in FIG. 9, has two blade-like elements 86".

In a further variation (not shown) of the invention, the arched member of the stirrer can have a generally parabolic, semi-elliptic or tapered shape or like shape, instead of a semi-circular shape.

Also shown in FIGS. 1 and 5, the appliances are fitted with heating elements that are connected to electric device 50. Details of suitable heating elements are described in greater details in the abovementioned WO2006/050900.

Heating element 56 and stirrer 85,85' may be controlled via push buttons 60 by the user. A stirrer may be associated with one or more buttons, for instance when the user is given the possibility to choose among several rotating speeds of the stirrer. Likewise, several buttons may be provided to choose a desired heating temperature. It will be apparent to the skilled person that many variations are possible to select and configure the control means so as to allow the user to choose, for example a desired heating temperature, stirring speed and conditioning duration and conditioning profile.

What is claimed is:

1. A milk or milk-based liquid conditioning appliance for preparation of a beverage, which comprises:
    a tank for receiving the milk or milk-based liquid that is to be conditioned;
    a closed compartment secured to the tank, wherein the compartment is water impervious and washable under running water without infiltration thereof into the compartment; and
    an electric device for imparting a conditioning effect to the liquid, with the device located in the compartment and below the tank,
    wherein the compartment includes a sidewall and is assembled to be water impervious so that the appliance can be washed without allowing water to contact the electrical device in the compartment;

wherein the electric device has at least one connection means extending through a first through-opening in an outer wall of the compartment, wherein each through-opening is water impervious by association with a sealing element located between a peripheral part of the connection means and the sidewall; and wherein the first through-opening is delimited by a surface of the sidewall that has a first portion that extends into the compartment and a second portion extending away at an angle from the first portion and having inward and outward facing surfaces to form a recessed shoulder, with the sealing element engaging at least the outward facing surface of the second portion at least part of the first portion to prevent contact of liquid with the second portion of the recessed shoulder and with the sealing element extending around the entire peripheral part of the connection means.

2. The appliance of claim 1, wherein the sealing element is deformable and compressed by and between the peripheral part of the connection means and the delimitation surface of the corresponding through-opening.

3. The appliance of claim 1, wherein the sealing element is made of plastic or elastic material that is cast between a peripheral part of the connection means and the sidewall.

4. The appliance of claim 1, wherein at least one connection means comprises an electric conductor rod or cable for supplying electric power from a power supply to the electric device or for communicating a signal to or from the electric device.

5. The appliance of claim 4, wherein the electrical conductor is a copper or aluminum based conductor.

6. The appliance of claim 1, wherein at least one connection means comprises or leads to a user interface for controlling the electric device, the user interface comprising a button and extending into the first through-opening.

7. The appliance of claim 6, wherein the button comprises a rigid support element, which has a peripheral surface that faces the surface of the sidewall delimiting the first through-opening, with the sealing element being compressed around the entire peripheral surface between and by the peripheral surface and the delimitation surface, and with the sealing element optionally being integral with or bonded to the button.

8. The appliance of claim 6, wherein the button comprises a movable member that extends through the first through-opening, the sealing element being located around the movable member, the movable member being arranged to communicate into the compartment a user command by displacement of the movable member in translation along the first through-opening or in rotation about a rotational axis extending through the first trough-opening or parallel thereto, the button being further in the form of a push button or rotational button.

9. The appliance of claim 1, wherein the compartment is formed by the assembly of at least two casing parts, the casing parts being so assembled to be water impervious, with at least one casing part formed by or with at least part of the tank, and with the other casing part formed by the sidewall of the compartment, with the sidewall terminating in an upper opening for receiving a lower portion of the tank therein, and wherein two of the casing parts have connection portions that are made of thermoplastic material that are joined by ultrasonic welds or that are made of metal-based materials that are welded together, with the connection portion welds located near the upper opening of the compartment sidewall.

10. The appliance of claim 1, wherein the compartment is formed by the assembly of at least two casing parts, the casing parts being so assembled to be water impervious, with at least one casing part formed by or with at least part of the tank, and with the other casing part formed by the sidewall of the compartment, with the sidewall terminating in an upper opening for receiving a lower portion of the tank therein, and wherein the casing parts are assembled via a sealing element that seals off the compartment between the upper opening of the compartment sidewall and the tank that is received therein, and wherein the sealing element is elastic or plastic and is compressed between the compartment sidewall and tank.

11. The appliance of claim 1, wherein the compartment is formed by the assembly of at least two casing parts, the casing parts being so assembled to be water impervious, with at least one casing part formed by or with at least part of the tank, and with the other casing part formed by the sidewall of the compartment, with the sidewall terminating in an upper opening for receiving a lower portion of the tank therein, and wherein the casing parts are assembled via connection portions and a sealing element comprising a body that extends over the surface of one connection portion and that is placed thereagainst; and a plurality of transverse members that protrude from the body to the surface of the facing connection portion and that are compressed between the body and the surface of the facing connection portion.

12. The appliance of claim 11, which further comprises a rigid support member secured to the connection portion of one of the casing parts to hold the cooperating connection portion of another casing part, with the cooperating connection portion being urged against the rigid support member by the compressed sealing element located between the cooperating connection portions.

13. The appliance of claim 1, wherein the compartment is formed by the assembly of at least two casing parts, the casing parts being so assembled to be water impervious, with at least one casing part formed by or with at least part of the tank, and with the other casing part formed by the sidewall of the compartment, with the sidewall terminating in an upper opening for receiving a lower portion of the tank therein, and wherein a first casing part is mechanically or further secured to or against a second casing part by a mechanical assembly member that extends through a through-opening in the first casing part, the through-opening being made water impervious by a sealing element located between a peripheral part of the mechanical assembly member and the first casing part.

14. The appliance of claim 13, wherein the through-opening is delimited by a surface of the first casing part, the delimitation surface having a periphery, the sealing element being located in-between the peripheral part of the mechanical assembly member and the delimitation surface and extending along the entire periphery of the delimitation surface around the mechanical assembly member, the sealing element being present between the peripheral part of the mechanical assembly member and the delimitation surface.

15. The appliance of claim 1, which further comprises a stirrer positioned in the tank for agitating the milk-based liquid, wherein the electrical device comprises:
  drive means for imparting a rotational movement to the stirrer; and
  heating means for heating the tank;
  wherein the drive means is operable independently from the heating means.

16. An appliance for conditioning a liquid made of or based on milk, which comprises:
  a tank for receiving a milk-based liquid that is to be conditioned;

a rotatable stirrer positioned in the tank for agitating the milk-based liquid and generating a froth in the tank, the stirrer including a top part that allows a user to grasp and remove the stirrer from the tank;

a closed compartment secured to the tank, wherein the compartment is water impervious and washable under running water without infiltration thereof into the compartment; and an electric device for imparting a conditioning effect to the liquid, with the device located in the compartment and below the tank, wherein the electric device comprises heating means for heating the tank and drive means for imparting a rotational movement to the stirrer located in the tank, with the drive means operable independently from the heating means.

17. The appliance of claim 16, which further comprises a stirrer positioning element in the tank, wherein the electric device in the compartment independently drives the stirrer in the tank by generating a rotating magnetic field in the compartment that drives the stirrer in the tank without any mechanical transmission element extending through the tank between the electric device and the stirrer, and wherein the stirrer is removably mounted on the stirrer positioning element in the tank.

18. The appliance of claim 17, wherein the rotatable stirrer comprises:

a positioning bottom part that is arranged to be removably mounted on the positioning element of the tank;

a peripheral part having stirring elements comprising turns of toroidally-shaped wire, impellers, blades, gratings or needles, and a top part extending generally upright from the peripheral part, the top part having a holding portion that is arranged to accommodate for human fingers so as to facilitate extraction and insertion of the stirrer on the positioning element of the tank.

19. The appliance of claim 18, wherein the top part of the rotatable stirrer is generally in the shape of an arched member that forms an upright loop, optionally the loop forming generally a circle or a fraction of a circle extending upwards from adjacent opposite sides of the peripheral part.

20. The appliance of claim 18, wherein the top part of the rotatable stirrer forms a loop further comprises an elongated upright member extending upwards from an upper end of the loop, the upright member being optionally topped with an laterally protruding element to facilitate seizure by human fingers.

21. The appliance of claim 17, which further comprises a user interface associated with the electrical device, the interface being arranged to also allow joint control of the drive means and heating means.

22. The appliance of claim 21, wherein the user interface comprises a first button for controlling the drive means and a second button for controlling the heating means, or a single button with different positions for simultaneously controlling the drive means and the heating means.

23. An appliance for conditioning a liquid made of or based on milk, which comprises:

a tank for receiving a milk-based liquid that is to be conditioned;

a rotatable stirrer positioned in the tank for agitating the milk-based liquid and generating a froth in the tank, the stirrer including a top part that allows a user to grasp and remove the stirrer from the tank;

a closed compartment secured to the tank, wherein the compartment is water impervious and washable under running water without infiltration thereof into the compartment; and an electric device for imparting a conditioning effect to the liquid, with the device located in the compartment and below the tank, wherein the compartment is formed by the assembly of at least two casing parts, the casing parts being so assembled to be water impervious, with at least one casing part formed by or with at least part of the tank, the compartment having a sidewall terminating in an upper opening for receiving a lower portion of the tank therein; and wherein the electric device comprises heating means for heating the tank and drive means for imparting a rotational movement to the stirrer located in the tank, with the heating means and drive means operable independently from one another.

* * * * *